US012810877B2

(12) United States Patent
Beack et al.

(10) Patent No.: US 12,810,877 B2
(45) Date of Patent: Nov. 24, 2026

(54) AUDIO SIGNAL ENCODING/DECODING METHOD AND APPARATUS FOR PERFORMING THE SAME

(71) Applicant: Electronics and Telecommunications Research Institute, Daejeon (KR)

(72) Inventors: Seung Kwon Beack, Daejeon (KR); Byeongho Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 340 days.

(21) Appl. No.: 18/435,334

(22) Filed: Feb. 7, 2024

(65) Prior Publication Data

US 2024/0290335 A1 Aug. 29, 2024

(30) Foreign Application Priority Data

Feb. 9, 2023 (KR) ........................ 10-2023-0017432

(51) Int. Cl.
*G10L 19/032* (2013.01)
*G10L 19/06* (2013.01)

(52) U.S. Cl.
CPC ............ *G10L 19/032* (2013.01); *G10L 19/06* (2013.01)

(58) Field of Classification Search
CPC .............................. G10L 19/032; G10L 19/06
See application file for complete search history.

(56) References Cited

U.S. PATENT DOCUMENTS 9,424,857 B2 8/2016 Sung et al.
10,621,998 B2 4/2020 Beack et al.
2007/0253481 A1* 11/2007 Oshikiri .................. G10L 19/24 704/E19.044
2008/0189118 A1* 8/2008 Lee ..................... G10L 19/0212 704/E21.001
2013/0030795 A1* 1/2013 Sung ................... G10L 19/0212 704/E19.01
2025/0063162 A1* 2/2025 Norvell ................... G10L 19/22

FOREIGN PATENT DOCUMENTS

KR 10-2022-0005383 A 1/2022
KR 10-2022-0079996 A 6/2022

OTHER PUBLICATIONS

Neuendorf et al. "MPEG Unified Speech and Audio Coding—The ISO/MPEG Standard for High-Efficiency Audio Coding of all Content Types" *Audio Engineering Society Convention 132*, Apr. 26-29, 2012 (pp. 1-22).

* cited by examiner

*Primary Examiner* — Bryan S Blankenagel
(74) *Attorney, Agent, or Firm* — NSIP Law

(57) ABSTRACT

Disclosed are an audio signal encoding/decoding method and an apparatus for performing the same. An audio signal encoding method includes receiving a current frame signal and a reconstructed previous frame signal, generating a predicted current frame signal, based on the current frame signal and the reconstructed previous frame signal, and outputting a reconstructed residual signal, based on the current frame signal and the predicted current frame signal.

12 Claims, 5 Drawing Sheets

160

AUDIO SIGNAL ENCODING/DECODING METHOD AND APPARATUS FOR PERFORMING THE SAME

CROSS-REFERENCE TO RELATED APPLICATION

This application claims the benefit of Korean Patent Application No. 10-2023-0017432 filed on Feb. 9, 2023, in the Korean Intellectual Property Office, the entire disclosure of which is incorporated herein by reference for all purposes.

BACKGROUND

1. Field of the Invention

One or more embodiments relate to an audio signal encoding/decoding method and an apparatus for performing the same.

2. Description of the Related Art

Audio coding technology is technology for efficiently transmitting audio signals by compressing the audio signals and externally transmitting the compressed audio signals. Given the growing complexity of audio signals, there is a need for the development of audio coding technology with better compression ratios.

The above description is information the inventor(s) acquired during the course of conceiving the present disclosure, or already possessed at the time, and is not necessarily art publicly known before the present application was filed.

SUMMARY

An embodiment may decrease the amount of transmitted information by coding an audio signal based on difference information between a current frame signal of the audio signal and a previous frame signal of the audio signal.

However, the technical goals are not limited to the foregoing goals, and there may be other technical goals.

According to an aspect, there is provided an audio signal encoding method including receiving a current frame signal and a reconstructed previous frame signal, generating a predicted current frame signal, based on the current frame signal and the reconstructed previous frame signal, and outputting a reconstructed residual signal, based on the current frame signal and the predicted current frame signal.

The current frame signal may include a time domain signal for a current frame, and the reconstructed previous frame signal may include a reconstructed frequency domain signal for a previous frame.

The generating of the predicted current frame signal may include transforming the time domain signal into a frequency domain signal, calculating a phase difference between the frequency domain signal and the reconstructed frequency domain signal, and synthesizing the predicted current frame signal based on the phase difference.

The calculating of the phase difference may further include calculating a gain difference between the frequency domain signal and the reconstructed frequency domain signal, and the synthesizing of the predicted current frame signal may include synthesizing the predicted current frame signal based on the gain difference and the phase difference.

The synthesizing of the predicted current frame signal may include quantizing each of the phase difference and the gain difference, calculating a reconstructed gain difference by dequantizing a quantized gain difference, calculating a reconstructed phase difference by dequantizing a quantized phase difference, and synthesizing the predicted current frame signal using the reconstructed gain difference and the reconstructed phase difference.

The outputting of the reconstructed residual signal may include calculating a residual signal by using the current frame signal and the predicted current frame signal, quantizing the residual signal, and outputting the reconstructed residual signal by dequantizing a quantized residual signal.

The audio signal encoding method may further include transmitting the reconstructed gain difference, the reconstructed phase difference, and the reconstructed residual signal to a decoder.

According to another aspect, there is provided an audio signal decoding method including receiving difference information between a current frame signal and a reconstructed previous frame signal, generating a predicted current frame signal from the reconstructed previous frame signal using the difference information, and obtaining a reconstructed current frame signal from the predicted current frame signal based on a residual signal between the current frame signal and the predicted current frame signal.

The difference information may include information on a difference between a frequency domain signal for a current frame and a reconstructed frequency domain signal for a previous frame.

The information may include first information on a gain difference between the frequency domain signal and the reconstructed frequency domain signal and second information on a phase difference between the frequency domain signal and the reconstructed frequency domain signal.

The first information may include a reconstructed gain difference generated by quantizing and dequantizing the gain difference, and the second information may include a reconstructed phase difference generated by quantizing and dequantizing the phase difference.

The generating of the predicted current frame signal may include generating a predicted frequency domain signal for a current frame from the reconstructed frequency domain signal using the information.

The obtaining of the reconstructed current frame signal may include obtaining a reconstructed frequency domain signal for a current frame by synthesizing the predicted frequency domain signal with a reconstructed signal of the residual signal.

According to another aspect, there is provided an apparatus for decoding an audio signal, the apparatus including a memory configured to store instructions and a processor electrically connected to the memory and configured to execute the instructions, wherein, when the instructions are executed by the processor, the processor may be configured to control a plurality of operations. The plurality of operations may include receiving a current frame signal and a reconstructed previous frame signal, generating a predicted current frame signal, based on the current frame signal and the reconstructed previous frame signal, and outputting a reconstructed residual signal, based on the current frame signal and the predicted current frame signal.

The current frame signal may include a time domain signal for a current frame, and the reconstructed previous frame signal may include a reconstructed frequency domain signal for a previous frame.

The generating of the predicted current frame signal may include transforming the time domain signal into a frequency domain signal, calculating a phase difference between the frequency domain signal and the reconstructed frequency domain signal, and synthesizing the predicted current frame signal based on the phase difference.

The calculating of the phase difference may further include calculating a gain difference between the frequency domain signal and the reconstructed frequency domain signal, and the synthesizing of the predicted current frame signal may include synthesizing the predicted current frame signal based on the gain difference and the phase difference.

The synthesizing of the predicted current frame signal may include quantizing each of the phase difference and the gain difference, calculating a reconstructed gain difference by dequantizing a quantized gain difference, calculating a reconstructed phase difference by dequantizing a quantized phase difference, and synthesizing the predicted current frame signal using the reconstructed gain difference and the reconstructed phase difference.

The outputting of the reconstructed residual signal may include calculating a residual signal by using the current frame signal and the predicted current frame signal, quantizing the residual signal, and outputting the reconstructed residual signal by dequantizing a quantized residual signal.

The plurality of operations may further include transmitting the reconstructed gain difference, the reconstructed phase difference, and the reconstructed residual signal to a decoder.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
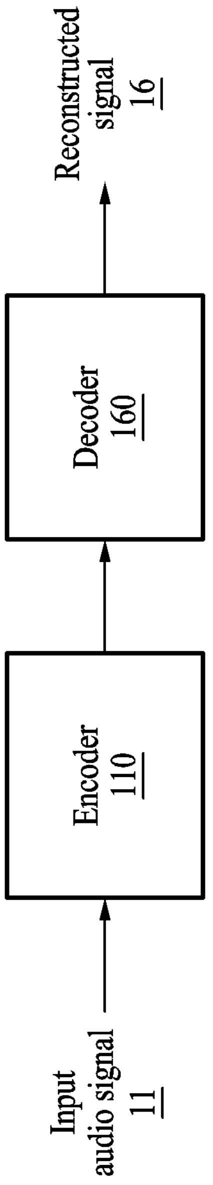
FIG. 1 is a diagram illustrating an encoder and a decoder according to an embodiment.

The following detailed structural or functional description is provided as an example only and various alterations and modifications may be made to embodiments. Accordingly, the embodiments are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example, the module may be implemented in a form of an application-specific integrated circuit (ASIC).

The term "unit" used herein may refer to a software or hardware component, such as a field-programmable gate array (FPGA) or an ASIC, and the "unit" performs predefined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more central processing units (CPUs) within a device or a security multimedia card. In addition, "unit" may include one or more processors.

Hereinafter, the embodiments will be described in detail with reference to the accompanying drawings. When describing the embodiments with reference to the accompanying drawings, like reference numerals refer to like elements and a repeated description related thereto will be omitted.

FIG. 1 is a diagram illustrating an encoder and a decoder according to an embodiment.

Referring to FIG. 1, according to an embodiment, an encoder 110 may encode an input audio signal 11 and output a bitstream. The input audio signal 11 may be a time domain signal. The description of the encoder 110 may be provided in detail with reference to FIGS. 2 and 4.

A decoder 160 may receive the bitstream from the encoder 110 and output a reconstructed signal 16 corresponding to the input audio signal 11 by decoding a coded signal. The reconstructed signal 16 may be a time domain signal. The description of the decoder 160 may be provided in detail with reference to FIGS. 3 and 5.

Figure 2:
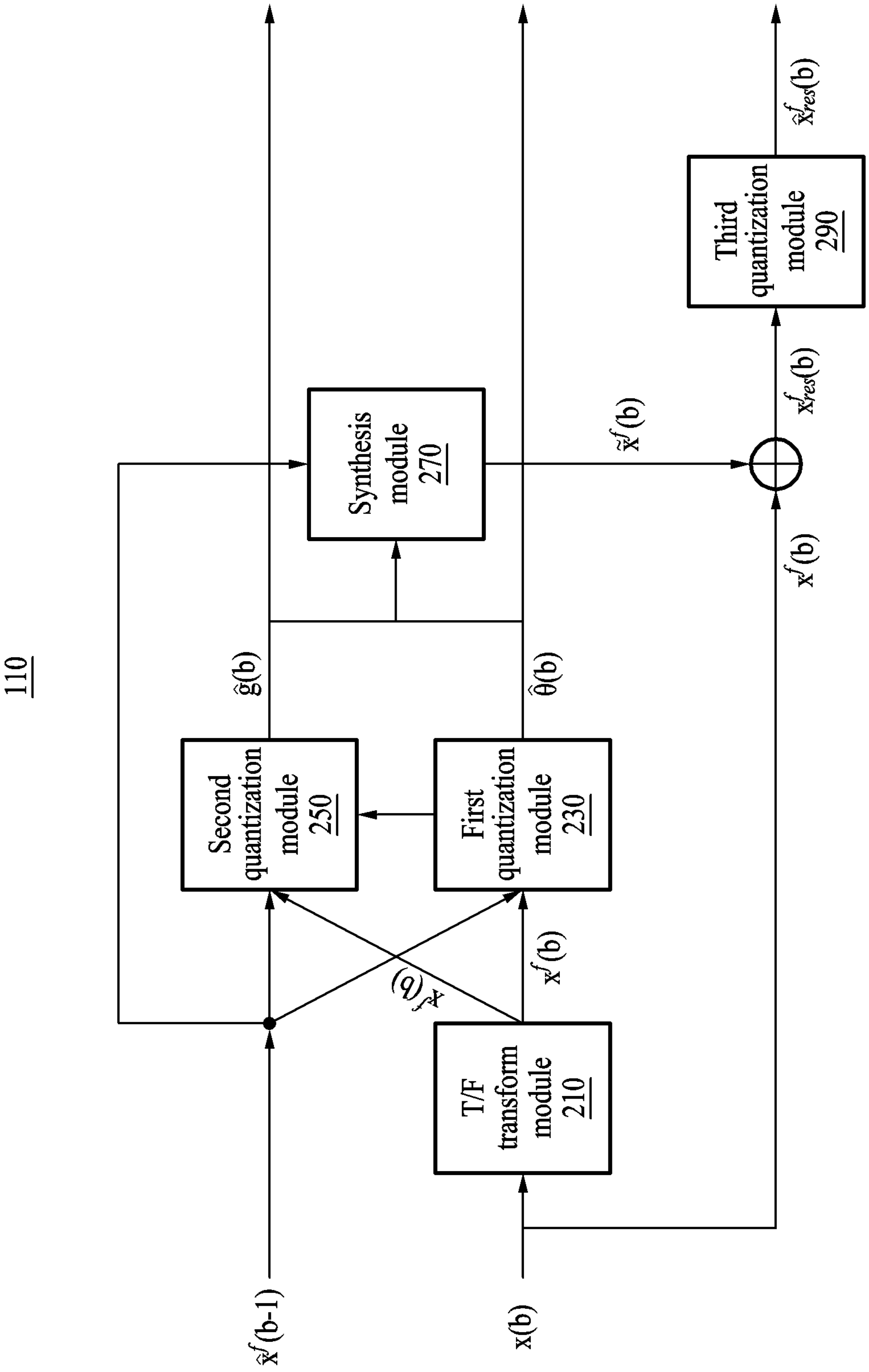
FIG. 2 is a diagram illustrating an encoder according to an embodiment.

FIG. 2 is a diagram illustrating an encoder according to an embodiment.

Referring to FIG. 2, according to an embodiment, the encoder 110 may include time-frequency (T/F) transform module 210, a first quantization module 230, a second quantization module 250, a synthesis module 270, and a third quantization module 290.

The T/F transform module 210 may receive a current frame signal (x(b)) of an input audio signal (e.g., the input audio signal 11 of FIG. 1). The current frame signal (x(b)) may be a time domain signal including N (e.g., N is a natural number) samples. b may denote a frame index of a current frame. The T/F transform module 210 may transform the time domain signal (x(b)) for the current frame into a frequency domain signal ($x^f$(b)). For example, the T/F transform module 210 may transform the current frame signal (x(b)) into the frequency domain signal ($x^f$(b)) using a transform method such as a discrete Fourier transform (DFT) or a modified discrete cosine transform (MDCT). Hereinafter, an example in which the current frame signal ((x(b)) is transformed into the frequency domain signal ($x^f$(b)) (e.g., a complex coefficient) using a DFT is described. However, DFT-based transformation is an example for convenience of description, and the scope of the present disclosure is not limited thereto. The frequency domain signal ($x^f$(b)) may be represented as a vector as expressed by Equation 1 below.

$$x^f(b) = \left[x^f(0, b), x^f(1, b), \ldots, x^f(M, b)\right]^T \qquad \text{[Equation 1]}$$

In Equation 1 above, the frequency domain signal ($x^f$(b)) may be a signal including M+1 samples. M may be equal to N/2 according to a symmetric property of the DFT.

The first quantization module 230 may receive the frequency domain signal ($x^f$(b)) for the current frame and a reconstructed frequency domain signal ($\hat{x}^f$(b−1)) for a previous frame. The reconstructed frequency domain signal ($\hat{x}^f$(b−1)) for the previous frame may be generated by a decoder (e.g., the decoder 160 of FIG. 1). The first quantization module 230 may calculate a phase difference (θ(b)) between the frequency domain signal ($x^f$(b)) and the reconstructed frequency domain signal ($\hat{x}^f$(b−1). For example, the phase difference (θ(b)) may be calculated as shown in Equation 2 below.

$$\theta(b) = a\tan 2\left(x^f(b) \times conj\left\{\hat{x}^f(b-1)\right\}\right) \qquad \text{[Equation 2]}$$

When the T/F transform module 210 transforms the time domain signal (x(b)) for the current frame into the frequency domain signal ($x^f$(b)) based on the MDCT rather than the DFT, the phase difference (θ(b)) may be calculated as shown in Equation 3 below.

$$\theta(b) = a\tan 2\left(x^f(b) \times \left\{\hat{x}^f(b-1)\right\}\right) \qquad \text{[Equation 3]}$$

The phase difference (θ(b)) may be expressed by Equation 4 below.

$$\theta(b) = [\theta(0, b), \theta(1, b), \ldots, \theta(M, b)]^T \qquad \text{[Equation 4]}$$

The first quantization module 230 may generate a reconstructed phase difference ($\hat{\theta}$(b)) by quantizing the phase difference (θ(b)) and dequantizing the quantized phase difference. A dequantization process may be the reverse of a quantization process, and quantization may be performed in various ways. The reconstructed phase difference ($\hat{\theta}$(b)) may be used as main information for synthesizing a predicted frequency domain signal ($\tilde{x}^f$(b)) for the current frame. The reconstructed phase difference ($\hat{\theta}$(b)) may be transmitted to the decoder 160 as a bitstream.

The second quantization module 250 may receive the frequency domain signal ($x^f$(b)) for the current frame and the reconstructed frequency domain signal ($\hat{x}^f$(b−1)) for the previous frame. The second quantization module 250 may calculate a gain difference (g(b)) between the frequency domain signal ($x^f$(b)) and the reconstructed frequency domain signal ($\hat{x}^f$(b−1)). For example, the gain difference (g(b)) may be calculated based on a frame (or a group) rather than a sample, as shown in Equation 5 below.

$$g(b) = [\underbrace{g(b), g(b), \ldots, g(b)}_{M+1}]^T \qquad \text{[Equation 5]}$$

g(b) in Equation 5 may be calculated as shown in Equation 6 below.

$$g(b) = \gamma \times \sqrt{\exp\left\{\log\left(\sum \text{abs}\left(x^f(b)\right) - \log\left(\sum \text{abs}\left(\hat{x}^f(b-1)\right)\right\}\right.} \qquad \text{[Equation 6]}$$

In Equation 6, γ may be an arbitrary positive real number. For example, γ may be a positive real number less than 1. However, Equation 6 is an example of a method of calculating g(b), g(b) may be set to an arbitrary positive real number value (e.g., 0.8).

The second quantization module 250 may generate a reconstructed gain difference ($\hat{g}$(b)) by quantizing the gain difference (g(b)) and dequantizing the quantized gain difference. A dequantization process may be the reverse of a quantization process, and quantization may be performed in various ways. The reconstructed gain difference ($\hat{g}$(b)) may be used as additional information for synthesizing the predicted frequency domain signal ($\tilde{x}^f$(b) for the current frame. The reconstructed gain difference ($\hat{g}$(b)) may be transmitted to the decoder 160 as a bitstream.

The synthesis module 270 may synthesize the predicted current frame signal ($\tilde{x}^f$(b)) using the reconstructed phase difference ($\hat{\theta}$(b)) or using the reconstructed phase difference ($\hat{\theta}$(b)) and the reconstructed gain difference ($\hat{g}$(b)). The predicted current frame signal ($\tilde{x}^f$(b)) may be a signal in a frequency domain. For example, the synthesis module 270 may generate the predicted current frame signal ($\tilde{x}^f(b)$) as shown in Equation 7 below.

$$\tilde{x}^f(b) = \hat{g}(b) \odot \left\{ \hat{x}(b-1) \odot \exp^{\left(i\hat{\theta}(b)\right)} \right\} \quad \text{[Equation 7]}$$

In Equation 7, ⊙ may denote a Hadamard product.

The encoder 110 may generate a residual signal $$\left(x^f_{res}(b)\right)$$

as shown in Equation 8 below.

$$x^f_{res}(b) = x^f(b) - \tilde{x}^f(b) \quad \text{[Equation 8]}$$

In Equation 8, the residual signal $$\left(x^f_{res}(b)\right)$$

may be the signal in a frequency domain.

The third quantization module 290 may generate a reconstructed residual signal $$\left(\hat{x}^f_{res}(b)\right)$$

by quantizing the residual signal $$\left(x^f_{res}(b)\right)$$

and dequantizing the quantized residual signal. The reconstructed residual signal $$\left(\hat{x}^f_{res}(b)\right)$$

may be transmitted to the decoder 160 as a bitstream.

According to an embodiment, the encoder 110 may decrease the amount of information in the residual signal for the current frame by predicting the current frame using the phase difference between the current frame and the previous frame.

Figure 3:
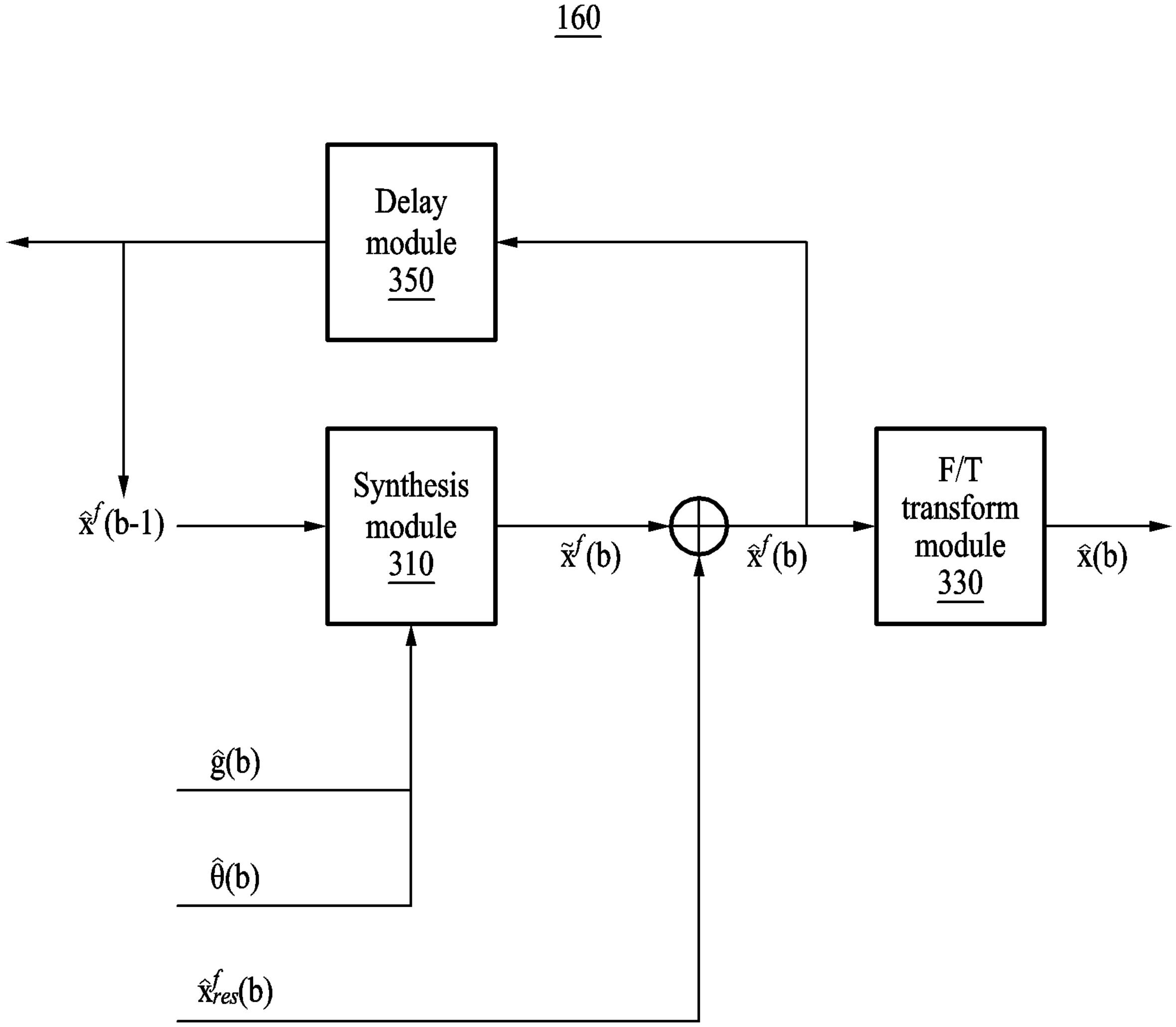
FIG. 3 is a diagram illustrating a decoder according to an embodiment.

FIG. 3 is a diagram illustrating a decoder according to an embodiment.

Referring to FIG. 3, according to an embodiment, the decoder 160 may include a synthesis module 310, a frequency-time (F/T) transform module 330, and a delay module 350.

The operation of the synthesis module 310 may be substantially the same as that of a synthesis module (e.g., the synthesis module 270 of FIG. 2) of an encoder (e.g., the encoder 110 of FIGS. 1 and 2). Accordingly, a repeated description thereof is omitted.

The decoder 160 may generate a reconstructed frequency domain signal ($\hat{x}^f(b)$) for a current frame using a predicted frequency domain signal ($\tilde{x}^f(b)$) for the current frame and a reconstructed residual signal $$\left(\hat{x}^f_{res}(b)\right),$$

as shown in Equation 9 below.

$$\hat{x}^f(b) = \hat{x}^f_{res}(b) + \tilde{x}^f(b) \quad \text{[Equation 9]}$$

The F/T transform module 330 may transform the frequency domain signal ($\hat{x}^f(b)$) for the current frame into a reconstructed time domain signal ($\hat{x}(b)$). The operation of the F/T transform module 330 may be the same as the reverse of the operation of the T/F transform module 210 included in the encoder 110. Accordingly, a detailed description thereof is omitted.

The delay module 350 may allow the reconstructed frequency domain signal ($\hat{x}^f(b)$) for the current frame to be used as the reconstructed frequency domain signal ($\hat{x}^f(b-1)$) for the previous frame in the encoder 110 and the decoder 160 by delaying the reconstructed frequency domain signal ($\hat{x}^f(b)$) for the current frame.

Figure 4:
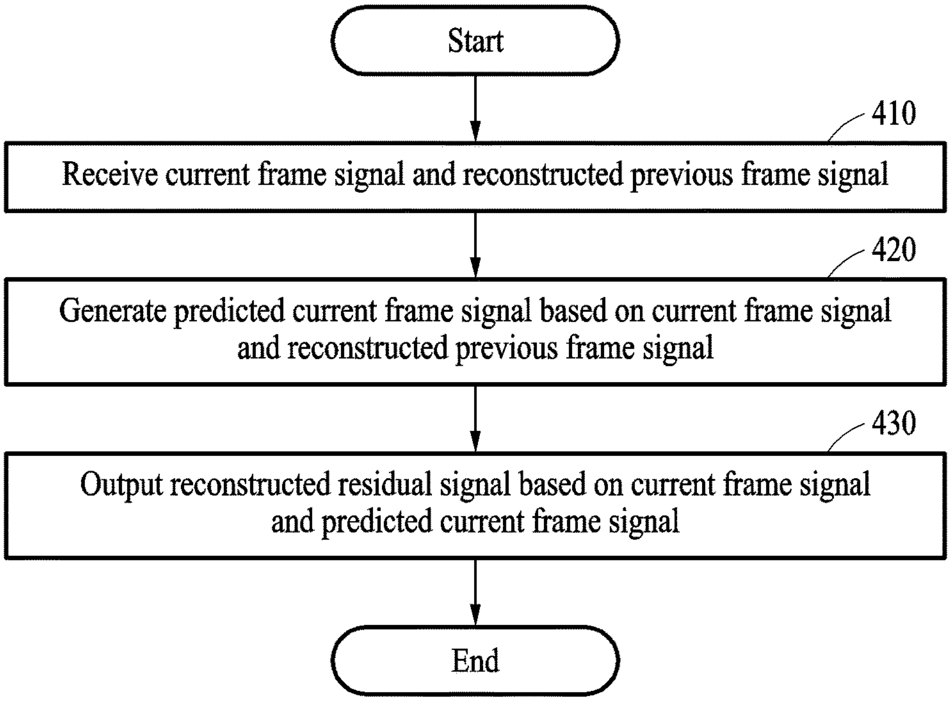
FIG. 4 is a diagram illustrating an operation of an encoder according to an embodiment.

FIG. 4 is a diagram illustrating an operation of an encoder according to an embodiment.

Referring to FIG. 4, according to an embodiment, operations 410 to 430 may be substantially the same as the operations of an encoder (e.g., the encoder 110 of FIGS. 1 and 2) described with reference to FIGS. 1 and 2. Accordingly, a repeated description thereof is omitted. Operations 410 to 430 may be performed sequentially, but embodiments are not limited thereto. For example, two or more operations may be performed sequentially.

In operation 410, the encoder 110 may receive a current frame signal (e.g., the time domain signal (x(b)) for the current frame of FIG. 2) and a reconstructed previous frame signal (e.g., the reconstructed frequency domain signal ($\hat{x}^f$(b−1) for the previous frame of FIG. 2).

In operation 420, the encoder 110 may generate a predicted current frame signal (e.g., the predicted frequency domain signal ($\tilde{x}^f(b)$) for the current frame of FIG. 2), based on the current frame signal (x(b)) and the reconstructed previous frame signal ($\hat{x}^f$(b−1).

In operation 430, the encoder 110 may output a reconstructed residual signal (e.g., the reconstructed residual signal for the current frame of FIG. 2), based on the current frame signal (x(b)) and the predicted current frame signal ($\tilde{x}^f(b)$).

Figure 5:
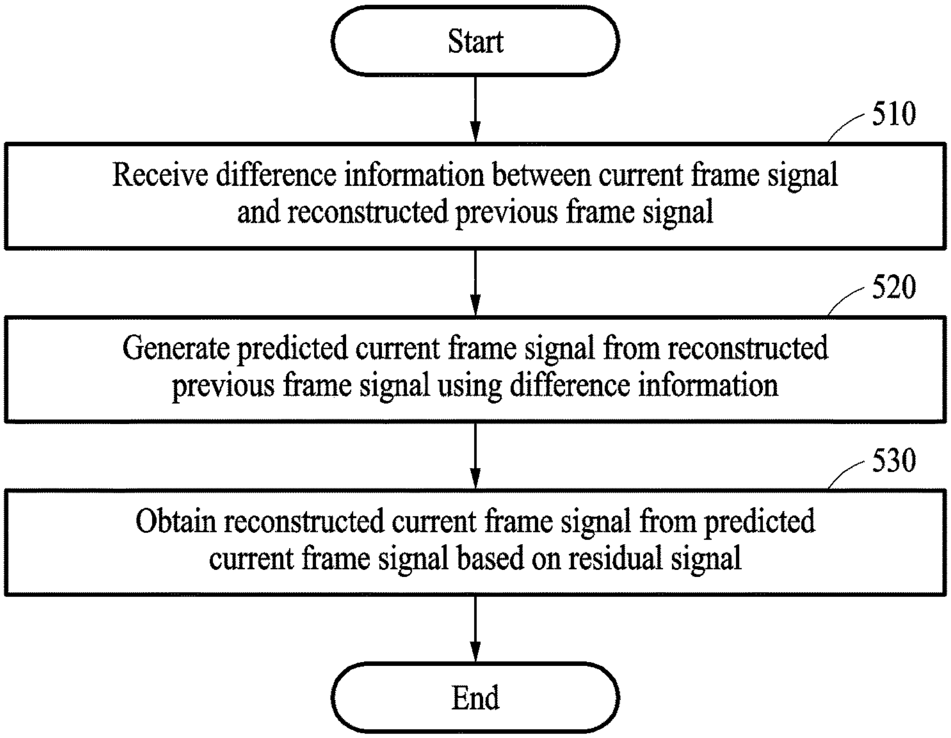
FIG. 5 is a diagram illustrating an operation of a decoder according to an embodiment.

FIG. 5 is a diagram illustrating an operation of a decoder according to an embodiment. Referring to FIG. 5, according to an embodiment, operations 510 to 530 may be substantially the same as the operations of a decoder (e.g., the decoder 160 of FIGS. 1 and 3) described with reference to FIGS. 1 and 3. Accordingly, a repeated description thereof is omitted. Operations 510 to 530 may be performed sequentially, but embodiments are not limited thereto. For example, two or more operations may be performed sequentially.

In operation 510, the decoder 160 may receive difference information (e.g., the reconstructed phase difference $\hat{\theta}(b)$) and the reconstructed gain difference ($\hat{g}(b)$) of FIGS. 2 and 3) between a current frame signal (e.g., the frequency domain signal ($x^f(b)$) for the current frame of FIG. 2) and a reconstructed previous frame signal (e.g., the reconstructed frequency domain signal ($\hat{x}^f(b-1)$) for the previous frame of FIG. 2).

In operation 520, the decoder 160 may generate a predicted current frame signal (e.g., the predicted frequency domain signal ($\tilde{x}^f(b)$) for the current frame of FIG. 3) from the reconstructed previous frame signal ($\hat{x}^f(b-1)$) using the difference information (e.g., the reconstructed phase difference ($\hat{\theta}(b)$) and the reconstructed gain difference ($\hat{g}(b)$)).

In operation 530-, the decoder 160 may obtain a reconstructed current frame signal (e.g., the reconstructed frequency domain signal ($\hat{x}^f(b)$) for the current frame of FIG. 3) from a predicted current frame signal ($\tilde{x}^f(b)$) based on a residual signal (e.g., the residual signal $$\left(x^f_{res}(b)\right)$$

of FIG. 2) between the current frame signal ($x^f(b)$) and the predicted current frame signal ($\tilde{x}^f(b)$).

Figure 6:
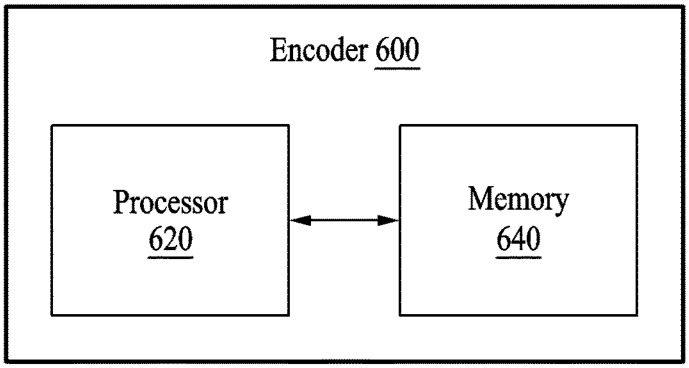
FIG. 6 is a schematic diagram illustrating an encoder according to an embodiment.

FIG. 6 is a schematic diagram illustrating an encoder according to an embodiment.

Referring to FIG. 6, according to an embodiment, an encoder 600 (e.g., the encoder 110 of FIGS. 1 and 2) may include a memory 640 and a processor 620.

The memory 640 may store instructions (or programs) executable by the processor 620. For example, the instructions may include instructions for executing an operation of the processor 620 and/or an operation of each component of the processor 620.

The memory 640 may include one or more computer-readable storage media. The memory 640 may include non-volatile storage elements (e.g., a magnetic hard disc, an optical disc, a floppy disc, flash memory, electrically programmable read-only memory (EPROM), and electrically erasable and programmable read-only memory (EEPROM).

The memory 640 may be a non-transitory medium. The term "non-transitory" may indicate that a storage medium is not embodied in a carrier wave or a propagated signal. However, the term "non-transitory" should not be interpreted to mean that the memory 640 is non-movable.

The processor 620 may process data stored in the memory 640. The processor 620 may execute computer-readable code (e.g., software) stored in the memory 640 and instructions triggered by the processor 620.

The processor 620 may be a hardware-implemented data processing device having a circuit that is physically structured to execute desired operations. For example, the desired operations may include code or instructions included in a program.

The hardware-implemented data processing device may include, for example, a microprocessor, a CPU, a processor core, a multi-core processor, a multiprocessor, an ASIC, and an FPGA.

An operation performed by the processor 620 may be substantially the same as the operation of the encoder 110 described with reference to FIGS. 1, 2, and 4. Accordingly, a detailed description thereof is omitted.

Figure 7:
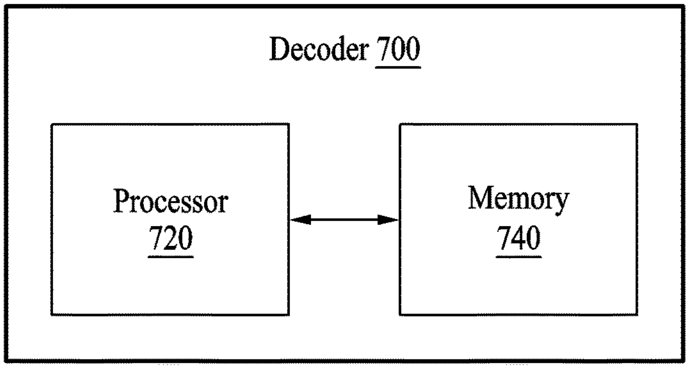
FIG. 7 is a schematic diagram illustrating a decoder according to an embodiment.

FIG. 7 is a schematic diagram illustrating a decoder according to an embodiment.

Referring to FIG. 7, according to an embodiment, a decoder 700 (e.g., the decoder 160 of FIGS. 1 and 3) may include a memory 740 and a processor 720.

The memory 740 may store instructions (or programs) executable by the processor 720. For example, the instructions may include instructions for executing an operation of the processor 720 and/or an operation of each component of the processor 720.

The memory 740 may include one or more computer-readable storage media. The memory 740 may include non-volatile storage elements (e.g., a magnetic hard disc, an optical disc, a floppy disc, flash memory, EPROM, and EEPROM).

The memory 740 may be a non-transitory medium. The term "non-transitory" may indicate that a storage medium is not embodied in a carrier wave or a propagated signal. However, the term "non-transitory" should not be interpreted to mean that the memory 740 is non-movable.

The processor 720 may process data stored in the memory 740. The processor 720 may execute computer-readable code (e.g., software) stored in the memory 740 and instructions triggered by the processor 720.

The processor 720 may be a hardware-implemented data processing device having a circuit that is physically structured to execute desired operations. For example, the desired operations may include code or instructions included in a program.

The hardware-implemented data processing device may include, for example, a microprocessor, a CPU, a processor core, a multi-core processor, a multiprocessor, an ASIC, and an FPGA.

An operation performed by the processor 720 may be substantially the same as the operation of the decoder 160 described with reference to FIGS. 1, 3, and 5. Accordingly, a detailed description thereof is omitted.

Figure 8:
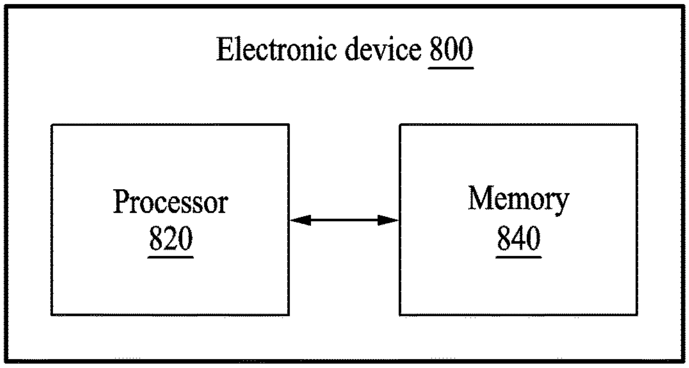
FIG. 8 is a schematic diagram illustrating an electronic device according to an embodiment.

FIG. 8 is a schematic diagram illustrating an electronic device according to an embodiment.

Referring to FIG. 8, according to an embodiment, an electronic device 800 may include a memory 840 and a processor 820.

The memory 840 may store instructions (or programs) executable by the processor 820. For example, the instructions may include instructions for executing an operation of the processor 820 and/or an operation of each component of the processor 820.

The memory 840 may include one or more computer-readable storage media. The memory 840 may include non-volatile storage elements (e.g., a magnetic hard disc, an optical disc, a floppy disc, flash memory, EPROM, and EEPROM).

The memory 840 may be a non-transitory medium. The term "non-transitory" may indicate that a storage medium is not embodied in a carrier wave or a propagated signal. However, the term "non-transitory" should not be interpreted to mean that the memory 840 is non-movable.

The processor 820 may process data stored in the memory 840. The processor 820 may execute computer-readable code (e.g., software) stored in the memory 840 and instructions triggered by the processor 820.

The processor 820 may be a hardware-implemented data processing device having a circuit that is physically structured to execute desired operations. For example, the desired operations may include code or instructions included in a program.

The hardware-implemented data processing device may include, for example, a microprocessor, a CPU, a processor core, a multi-core processor, a multiprocessor, an ASIC, and an FPGA.

An operation performed by the processor 820 may be substantially the same as the operation of an encoder (e.g., the encoder 110 of FIGS. 1 and 2) and a decoder (e.g., the decoder 160 of FIGS. 1 and 3) described with reference to FIGS. 1 to 5. Accordingly, a detailed description thereof is omitted.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as floptical disks; and hardware devices that are specially configured to store and perform program instructions, such as ROM, random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the following claims.

What is claimed is:

1. An audio signal encoding method, comprising:
receiving a current frame signal and a reconstructed previous frame signal;
generating a predicted current frame signal, based on the current frame signal and the reconstructed previous frame signal; and
outputting a reconstructed residual signal, based on the current frame signal and the predicted current frame signal,
wherein the current frame signal comprises a time domain signal for a current frame, and the reconstructed previous frame signal comprises a reconstructed frequency domain signal for a previous frame,
wherein the generating of the predicted current frame signal comprises:
transforming the time domain signal into a frequency domain signal;
calculating a phase difference between the frequency domain signal and the reconstructed frequency domain signal;
calculating a gain difference between the frequency domain signal and the reconstructed frequency domain signal; and
synthesizing the predicted current frame signal based on the gain difference and the phase difference.

2. The audio signal encoding method of claim 1, wherein the synthesizing of the predicted current frame signal comprises:
quantizing each of the phase difference and the gain difference;
calculating a reconstructed gain difference by dequantizing a quantized gain difference;
calculating a reconstructed phase difference by dequantizing a quantized phase difference; and
synthesizing the predicted current frame signal using the reconstructed gain difference and the reconstructed phase difference.

3. The audio signal encoding method of claim 2, further comprising:
transmitting the reconstructed gain difference, the reconstructed phase difference, and the reconstructed residual signal to a decoder.

4. The audio signal encoding method of claim 1, wherein the outputting of the reconstructed residual signal comprises:
calculating a residual signal by using the current frame signal and the predicted current frame signal;
quantizing the residual signal; and
outputting the reconstructed residual signal by dequantizing a quantized residual signal.

5. An audio signal decoding method comprising:
receiving difference information between a current frame signal and a reconstructed previous frame signal;
generating a predicted current frame signal from the reconstructed previous frame signal using the difference information; and
obtaining a reconstructed current frame signal from the predicted current frame signal based on a residual signal between the current frame signal and the predicted current frame signal,
wherein the difference information comprises first information on a gain difference between a frequency domain signal for a current frame and a reconstructed frequency domain signal for a previous frame, and second information on a phase difference between the frequency domain signal for the current frame and the reconstructed frequency domain signal for the previous frame.

6. The audio signal decoding method of claim 5, wherein:

the first information comprises a reconstructed gain difference generated by quantizing and dequantizing the gain difference, and the second information comprises a reconstructed phase difference generated by quantizing and dequantizing the phase difference.

7. The audio signal decoding method of claim 5, wherein the generating of the predicted current frame signal comprises generating a predicted frequency domain signal for a current frame from the reconstructed frequency domain signal using the information.

8. The audio signal decoding method of claim 7, wherein the obtaining of the reconstructed current frame signal comprises obtaining a reconstructed frequency domain signal for a current frame by synthesizing the predicted frequency domain signal with a reconstructed signal of the residual signal.

9. An apparatus for encoding an audio signal, the apparatus comprising:

a memory configured to store instructions; and a processor electrically connected to the memory and configured to execute the instructions, wherein, when the instructions are executed by the processor, the processor is configured to control a plurality of operations, and wherein the plurality of operations comprises:

receiving a current frame signal and a reconstructed previous frame signal;

generating a predicted current frame signal, based on the current frame signal and the reconstructed previous frame signal; and outputting a reconstructed residual signal, based on the current frame signal and the predicted current frame signal, wherein the current frame signal comprises a time domain signal for a current frame, and the reconstructed previous frame signal comprises a reconstructed frequency domain signal for a previous frame, wherein the generating of the predicted current frame signal comprises:

transforming the time domain signal into a frequency domain signal;

calculating a phase difference between the frequency domain signal and the reconstructed frequency domain signal;

calculating a gain difference between the frequency domain signal and the reconstructed frequency domain signal; and synthesizing the predicted current frame signal based on the gain difference and the phase difference.

10. The apparatus of claim 9, wherein the synthesizing of the predicted current frame signal comprises:

quantizing each of the phase difference and the gain difference;

calculating a reconstructed gain difference by dequantizing a quantized gain difference;

calculating a reconstructed phase difference by dequantizing a quantized phase difference; and synthesizing the predicted current frame signal using the reconstructed gain difference and the reconstructed phase difference.

11. The apparatus of claim 10, wherein the plurality of operations further comprises transmitting the reconstructed gain difference, the reconstructed phase difference, and the reconstructed residual signal to a decoder.

12. The apparatus of claim 9, wherein the outputting of the reconstructed residual signal comprises:

calculating a residual signal by using the current frame signal and the predicted current frame signal;

quantizing the residual signal; and outputting the reconstructed residual signal by dequantizing a quantized residual signal.

* * * * *